US012730220B2

(12) United States Patent
Chen et al.

(10) Patent No.: US 12,730,220 B2
(45) Date of Patent: Sep. 8, 2026

(54) SYSTEM AND METHOD FOR SENSING UNDERWATER POINT CLOUD

(71) Applicant: METAL INDUSTRIES RESEARCH & DEVELOPMENT CENTRE, Kaohsiung (TW)

(72) Inventors: Wei-Te Chen, Changhua County (TW); Shang-Ching Chuang, Kaohsiung City (TW); Chen-Shun Chen, Kaohsiung City (TW); Pin-Xian Lin, Chiayi City (TW); Chen-Han Kuo, Kaohsiung City (TW); Yun-Hui He, Miaoli County (TW); Yao-Ming Wang, Kaohsiung City (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 149 days.

(21) Appl. No.: 18/755,657

(22) Filed: Jun. 26, 2024

(65) Prior Publication Data

US 2025/0164640 A1 May 22, 2025

(30) Foreign Application Priority Data

Nov. 21, 2023 (TW) ................................ 112144963

(51) Int. Cl.
*G01S 15/89* (2006.01)
*G01S 7/52* (2006.01)

(52) U.S. Cl.
CPC .......... *G01S 15/89* (2013.01); *G01S 7/52004* (2013.01)

(58) Field of Classification Search
CPC ............................ G01S 15/89; G01S 7/52004
See application file for complete search history.

(56) References Cited

U.S. PATENT DOCUMENTS

| | | | | |
|---|---|---|---|---|
| 2016/0011310 | A1* | 1/2016 | Horner .................... | G01S 15/89 345/419 |
| 2019/0235083 | A1 | 8/2019 | Zhang et al. | |
| 2019/0360810 | A1 | 11/2019 | Johnson et al. | |
| 2022/0051475 | A1* | 2/2022 | Bingham ................ | G06T 17/05 |
| 2023/0135088 | A1 | 5/2023 | Wang et al. | |

FOREIGN PATENT DOCUMENTS

| | | | |
|---|---|---|---|
| CN | 114063084 | A | 2/2022 |
| CN | 114137566 | A | 3/2022 |
| CN | 115629390 | A | 1/2023 |
| CN | 116429069 | A | 7/2023 |
| CN | 116486104 | A | 7/2023 |
| TW | I358606 | B | 2/2012 |

* cited by examiner

*Primary Examiner* — Krystine E Breier
(74) *Attorney, Agent, or Firm* — CKC & Partners Co., LLC

(57) ABSTRACT

The present invention proposes a method for sensing underwater point cloud. The method includes: acquiring point cloud information through an underwater sonar array, where the point cloud information contains multiple points; rearranging these points into a matrix which includes the aforementioned points and multiple missing points; and for each missing point, interpolating its depth value based on the depth values of several neighboring points.

13 Claims, 6 Drawing Sheets

SYSTEM AND METHOD FOR SENSING UNDERWATER POINT CLOUD

CROSS-REFERENCE TO RELATED APPLICATION

This application claims priority to Taiwan Application Serial Number 112144963, filed on Nov. 21, 2023, which is herein incorporated by reference in its entirety.

BACKGROUND

Field of Invention

The present invention relates to sensing system and calibration method for point cloud and image.

Description of Related Art

Point cloud is a data set composed of a series of points in three-dimensional space, and commonly used in various surveying and three-dimensional scanning technologies. Generally, each of the points of the point cloud has its definite position expressed in the form of X, Y, Z coordinates. The points are usually obtained from surface scanning performed on real-world objects, and can be used to capture and recreate the shape and appearance of the objects or environment. Point cloud data can be obtained through various methods, such as scanning by using a laser, scanning by using an optical scanner, scanning by using structured light scanning technology. In a case that an underwater sonar is used to obtain point clouds, the points of the point clouds may be located at great distances from each other when the underwater sonar has a longer distance from a seabed, and this causes the point cloud to be sparse. In contrast, when the underwater sonar has a shorter distance from the seabed, it is easy to cause the point cloud to have missing points leading to incompletion.

SUMMARY

The embodiments of the present invention provide a system for sensing underwater point cloud. The system includes an underwater sonar array and a computing module. The underwater sonar array is configured to acquire point cloud information including plural points. The computing module is communicatively connected to the underwater sonar array, in which the computing module is configured to rearrange the points into a matrix including the points and plural missing points. The computing module performs an interpolation calculation for each of the missing points based on depth values of neighboring points among the points to obtain a depth value of each of the missing points.

In some embodiments, the computing module redetermines a X-coordinate and a Y-coordinate of one of the points based on an arrangement direction of sensors of the underwater sonar array.

In some embodiments, the computing module performs the interpolation calculation to obtain the depth value of each of the missing points based on the following equation 1:

$$Z = \frac{\sum_{i=1}^{n} \frac{Z_i}{r_i^p}}{\sum_{i=1}^{n} \frac{1}{r_i^p}} \qquad \text{[Equation 1]}$$

wherein Z is the depth value of one of the missing point, i is a positive integer, n is a number of the neighboring points, $$r_i^p$$

is a distance between one of the neighboring points and the one of the missing point, and $Z_i$ is a depth value of one of the e neighboring points.

In some embodiments, the computing module is further configured to calculate an interpolation depth corresponding to one of the missing points based on a thin plate spline interpolation algorithm, and to calculate an average value of the interpolation depth and the depth value Z to compensate the corresponding missing point.

In some embodiments, the system further includes an image sensor configured to capture a digital image comprising a plurality of pixels, wherein each of the pixels comprises a red gray value, a green gray value and a blue gray value, and the computing module is configured to calibrate a depth value of one of the missing points based on the following equation 2:

$$P_C = P'' + [((R'' - R_{avg}) \times W_{RC}) + ((G'' - G_{avg}) \times W_{GC}) + ((B'' - B_{avg}) \times W_{BC})] \qquad \text{[Equation 2]}$$

$$W_{RC} = \frac{R_{avg}}{\frac{1}{P''}}$$

$$W_{GC} = \frac{G_{avg}}{\frac{1}{P''}}$$

$$W_{BC} = \frac{B_{avg}}{\frac{1}{P''}}$$

wherein $P_C$ is a calibrated depth value, P" is the depth value of the one of the missing points, R" is the red gray value of the one of the missing points, G" is the green gray value of the one of the missing points, B" is the blue gray value of the one of the missing points, $R_{avg}$ is an average red gray value of a plurality of similar pixels among the pixels, $G_{avg}$ is an average green gray value of the similar pixels among the pixels, and $B_{avg}$ is an average blue gray value of the similar pixels among the pixels.

In some embodiments, the point cloud information corresponds to an area of steep slope.

In some embodiments, the point cloud information corresponds to a side of an object.

In another aspect, the embodiments of the present invention provide a method for sensing underwater point cloud executed by a computer system. The method includes: acquiring point cloud information through an underwater sonar array, wherein the point cloud information comprises a plurality of points; rearranging the points into a matrix comprising the points and a plurality of missing points; and performing an interpolation calculation for each of the missing points based on depth values of neighboring points among the points to obtain a depth value of each of the missing points.

In some embodiments, rearranging the points into the matrix includes: redetermining a X-coordinate and a Y-coordinate of one of the points based on an arrangement direction of sensors of the underwater sonar array.

In some embodiments, performing the interpolation calculation to obtain the depth value of each of the missing points is based on the above equation 1.

In some embodiments, the method for sensing underwater point cloud further includes: calculating an interpolation depth corresponding to one of the missing points based on a thin plate spline interpolation algorithm, and calculating an average value of the interpolation depth and the depth value Z to compensate the corresponding missing point.

In some embodiments, the method for sensing underwater point cloud further includes: capturing a digital image through an image sensor, wherein the digital image comprises a plurality of pixels, each of the pixels comprises a red gray value, a green gray value and a blue gray value, and calibrating a depth value of one of the missing points based on the above equation 2.

In some embodiments, the method for sensing underwater point cloud further includes: performing a down sampling process on the digital image to allow the pixels of the digital image to be corresponded by the points of the point cloud information in a one-to-one manner.

In some embodiments, the point cloud information corresponds to an area of steep slope.

In some embodiments, the point cloud information corresponds to a side of an object.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
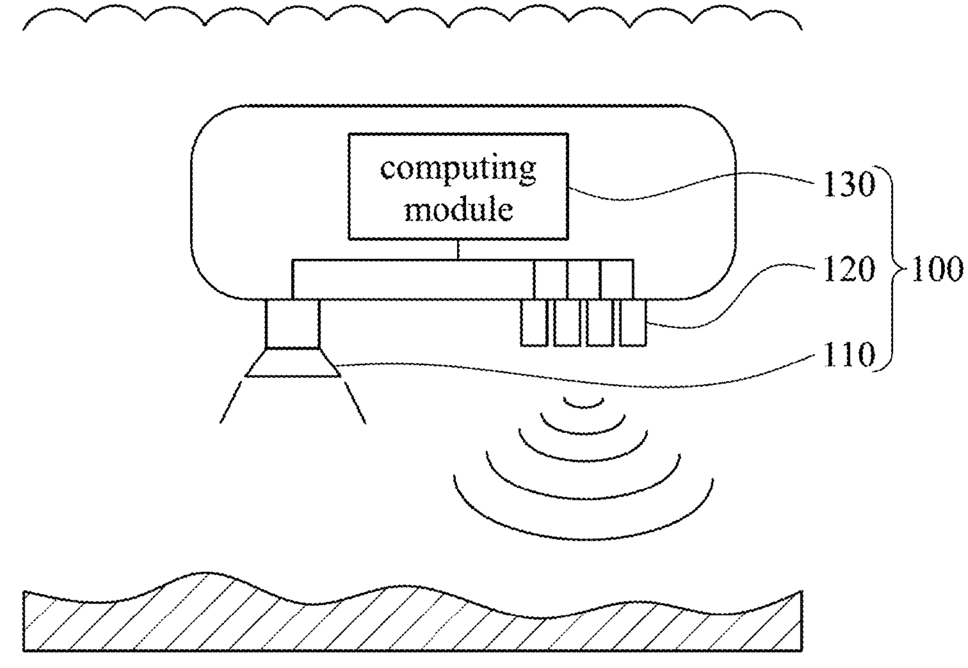
FIG. 1 is a schematic diagram showing a sensing system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

The using of "first", "second", "third", etc. in the specification should be understood for identifying units or data described by the same terminology but are not referred to particular order or sequence.

FIG. 1 is a schematic diagram showing a system 100 (hereinafter, sensing system 100) for sensing underwater point cloud according to an embodiment of the present invention. The sensing system 100 includes an image sensor 110, an underwater sonar array 120 and a computing module 130. The image sensor 110 may include a charge-coupled device (CCD) sensor, a complementary metal-oxide semiconductor (Complementary Metal-Oxide Semiconductor) sensor, or other suitable photosensitive components. The underwater sonar array 120 includes plural sonar sensors arranged in an array. According to the principle of sonar, each of the sonar sensors is capable of obtaining depth values, and the depth values plus corresponding X coordinate and Y coordinate form a point, and a plural of the points form point cloud information. The computing module 130 may be a controller, a central processing unit, any electronic device, or computer system with computing capabilities. In the embodiment of FIG. 1, the image sensor 110, the underwater sonar array 120 and the computing module 130 are disposed in an underwater drone. However, in other embodiments, these devices can be disposed separately. For example, the computing module 130 can be a personal computer, a server, etc., disposed on a shore, and is communicatively connected to the image sensor 110 and the underwater sonar array 120 through appropriate means, or the computing module 130 processes data in an offline manner after the image sensor 110 and the underwater sonar array 120 collect the data. The computing module 130 is configured to perform a method for sensing underwater point cloud. This method will be described below.

Figure 2:
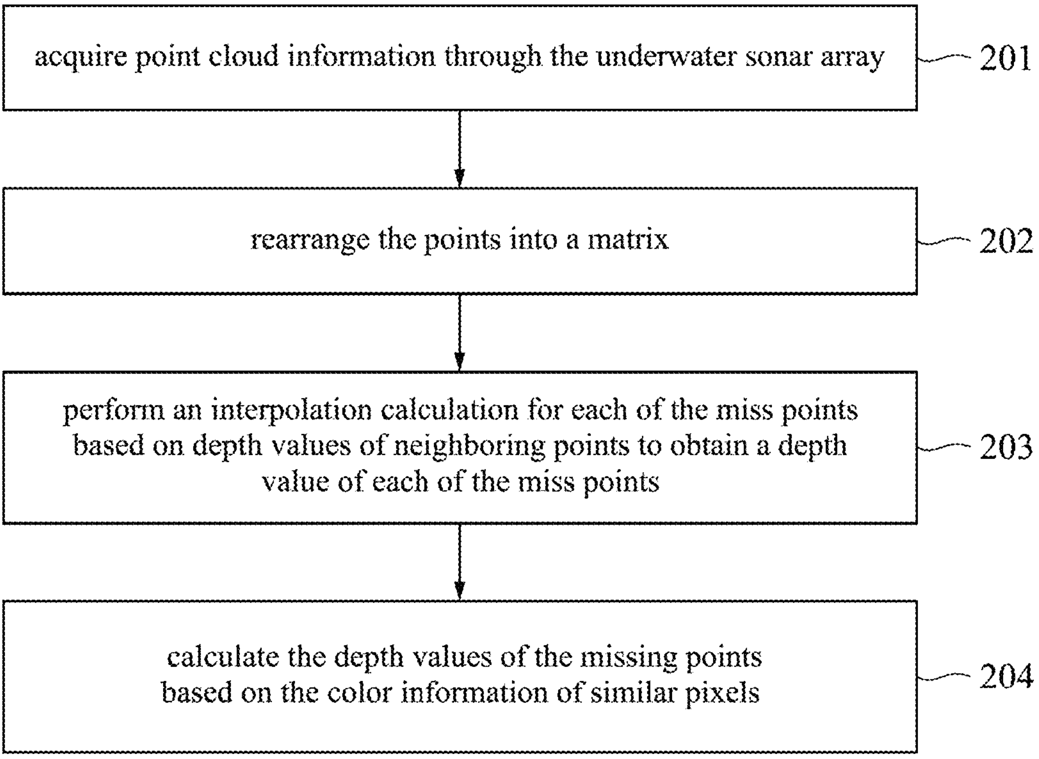
FIG. 2 is a schematic diagram showing a flowchart of a method for sensing underwater point cloud according to an embodiment of the present invention.
Figure 3:
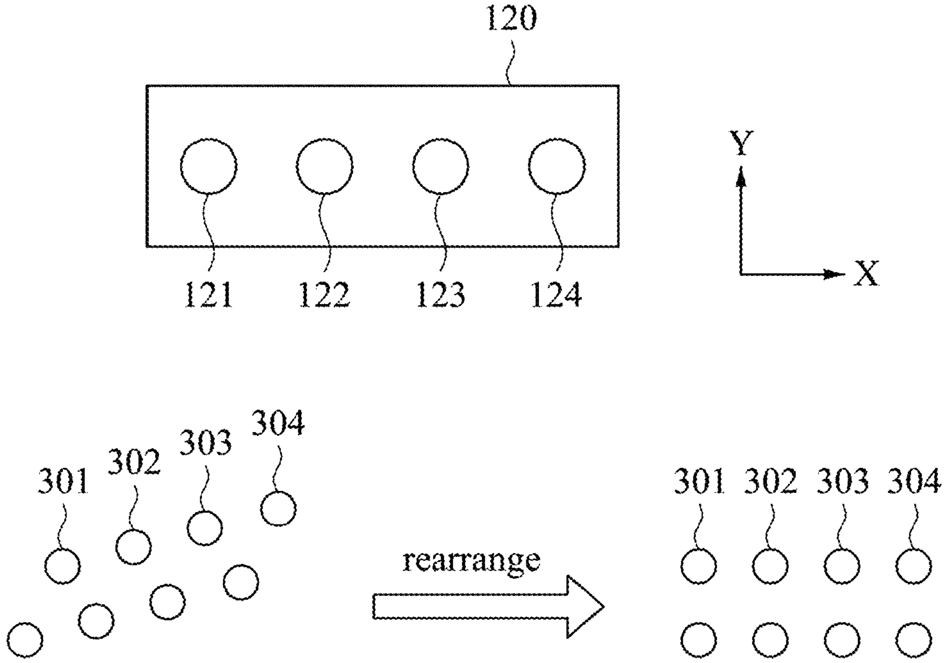
FIG. 3 is a schematic diagram showing rearranging points according to an embodiment of the present invention.

FIG. 2 is a schematic diagram showing a flowchart of a method for sensing underwater point cloud according to an embodiment of the present invention. Referring to FIG. 1 and FIG. 2 simultaneously, in step 201, point cloud information is acquired through the underwater sonar array, in which the point cloud information includes the points. In step 202, the points are rearranged into a matrix. Specifically, FIG. 3 is a schematic diagram showing rearranging the points according to an embodiment of the present invention. Referring to FIG. 3, in this embodiment, the underwater sonar array 120 includes a total of four sonar sensors 121-124. These four sonar sensors 121-124 emit sound waves in sequence, and depths can be calculated according to the return time of the sound waves. The depths plus X coordinates and Y coordinates form points 301-304. The four points 301-304 are sensed by the sonar sensors 121-124, respectively. However, since the underwater drone keeps moving, the formed points 301-304 are slightly shifted (shifted in the Y direction in FIG. 3). Since the sonar sensors 121-124 are arranged along the X direction (also referred to as sensor arrangement direction), the sensed points are expected to be arranged along the X direction. Here, the point 301 is fixed first, and then the points 302-304 are rearranged along the X direction, thereby redetermining the X coordinates and the Y coordinates of the points 302-304 (for example, fix the Y coordinates and set the X coordinates at a fixed interval). All points are processed in a similar way. The sensed points are messy originally, but form a matrix after rearranging.

Figure 4:
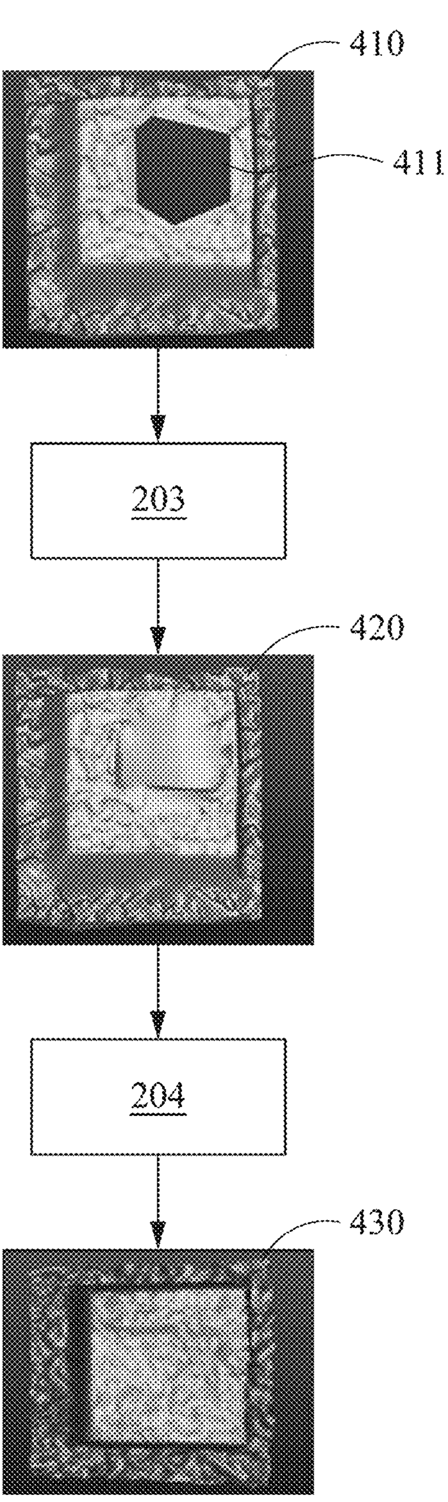
FIG. 4 is a schematic diagram showing triangular mesh models in various optimized stages according to an embodiment of the present invention.

If the distances between the sonar sensors 121-124 and the seabed are short, local missing points are likely to occur and results in plural missing points in the above matrix. For example, FIG. 4 is a schematic diagram showing triangular mesh models in various optimized stages according to an embodiment of the present invention. Referring to FIG. 4, after the points are rearranged, a triangular mesh model 410 can be generated according to the point clouds, in which the triangular mesh model 410 has holes 411 (i.e., missing points). Therefore, in step 203, an interpolation calculation is performed for each of the missing points based on depth values of neighboring points to obtain a depth value of each of the missing points.

Figure 5:
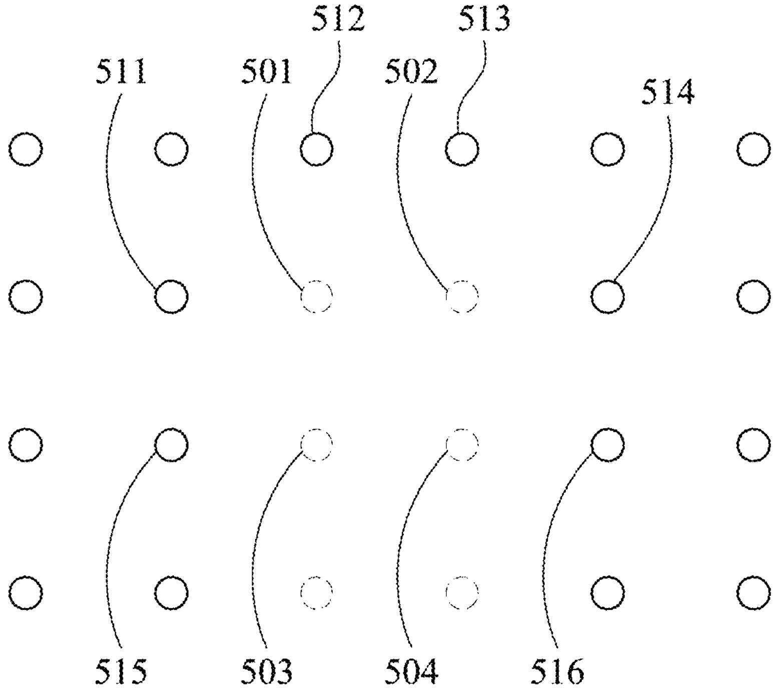
FIG. 5 is a schematic diagram showing interpolated depth values according to an embodiment of the present invention.

FIG. 5 is a schematic diagram showing interpolated depth values according to an embodiment of the present invention. Referring to FIG. 5, in this embodiment, the point cloud arrangement matrix includes missing points 501-504. The missing point 501 neighbors on points 511, 512, the missing point 502 neighbors on points 513, 514, and so on. The depth value of the missing point 501 can be interpolated base on the depth values of the neighboring points 511 and 512. The specific calculation is shown in the following equation 1.

$$Z = \frac{\sum_{i=1}^{n} \frac{Z_i}{r_i^p}}{\sum_{i=1}^{n} \frac{1}{r_i^p}} \quad \text{[Equation 1]}$$

Z is the depth value of one of the missing point, i is a positive integer, n is a number of the neighboring points, $$r_i^p$$

is a distance between one of the neighboring points and the one of the missing point, and $Z_i$ is a depth value of one of the neighboring points. For example, when depth calculation is performed with respect to the missing point 501, a number of the neighboring points 511 and 512 is 2, the depth of the neighboring points 511 and 512 is $Z_i$ of the above equation 1, a distance between the missing point 501 and the neighboring point 511 (or 512) is $$r_i^p$$

of the above equation 1, and the interpolated depth value Z is the depth value of the missing point 501. In this embodiment, upper, lower, left, and right points are used as neighboring points. However, in other embodiments, eight or more surrounding points can be used as neighboring points. The present disclosure is not limited thereto. In this embodiment, the interpolated missing points can be considered as neighboring points of other missing points. For example, when depth calculation is performed with respect to the missing point 502, the missing point 501, the point 513 and the point 514 are used as neighboring points. When depth calculation is performed with respect to the missing point 503, the missing point 501 and the point 515 are used as neighboring points. When depth calculation is performed with respect to the missing point 504, the missing point 502, the missing point 503 and the point 516 are used as neighboring points. Here, row-by-row scanning can be performed to interpolate all missing points in sequence.

In some embodiments, other suitable interpolation algorithms can be used. For example, the interpolated depth value corresponding to the missing point can be calculated based on a thin plate spline interpolation algorithm, and an average of the interpolated depth value and the above-mentioned depth value Z can be used to compensate the corresponding missing point. In other embodiments, interpolated depth values calculated by more interpolation algorithms can be used, and these interpolated depth values and the above-mentioned depth value Z are averaged.

The triangular mesh model 420 established according to the interpolated point cloud information is shown in FIG. 4. It can be understand that the triangular mesh model 420 has no holes. However, since a general interpolation algorithm is considered as a low-pass filter, the interpolated texture tends to be smooth even if there are no holes, and the interpolated texture does not fit the actual situation on the seabed. Therefore, step 204 can be performed subsequently to calibrate the depth values of the missing points based on the color information of similar pixels. Specifically, the image sensor 110 in FIG. 1 obtains a digital image. The digital image includes plural pixels, and each of the pixels includes a red grayscale value, a green grayscale value, and a blue grayscale value. In general, the resolution of the digital image is higher than the resolution of point cloud information. Therefore, reducing or down-sampling can be performed to enable the pixels in the digital image to correspond to the points in the point cloud information in a one-to-one manner. Here, the above-mentioned interpolated depth value is represented as P", the corresponding red grayscale value of the pixel is represented as R", the corresponding green grayscale value is represented as G", and the corresponding blue grayscale value is represented as B", that is to say, the missing point correspond to the grayscale values (R", G", B") in the digital image.

Since changes in color may reflect changes in depth, the depth values of missing points can be calibrated based on the depth values corresponding to pixels having similar colors. Specifically, plural similar pixels similar to grayscale values (R", G", B") can be obtained. For example, the grayscale values (R", G", B") are considered as a vector, and other pixels having Euclidean distances smaller than a threshold value are considered as the similar pixels. Thereafter, an average of the red grayscale values of the similar pixels is calculated, and represented by $R_a$vg below. $R_a$vg is referred to as red grayscale average. Similarly, an average of the green grayscale values of the similar pixels is calculated, and represented by $G_a$vg below. $G_a$vg is referred to as green grayscale average. An average of the blue grayscale values of the similar pixels is calculated, and represented by $B_a$vg below. $B_a$vg is referred to as green grayscale average. Then, the depth value each of the missing points can be calibrated based on the following equation 2:

$$P_C = P'' + [((R'' - R_{avg}) \times W_{RC}) + ((G'' - G_{avg}) \times W_{GC}) + ((B'' - B_{avg}) \times W_{BC})] \quad \text{[Equation 2]}$$

$$W_{RC} = \frac{R_{avg}}{\frac{1}{P''}}$$

$$W_{GC} = \frac{G_{avg}}{\frac{1}{P''}}$$

$$W_{BC} = \frac{B_{avg}}{\frac{1}{P''}}$$

$P_C$ is a calibrated depth value. $W_{RC}$, $W_{GC}$ and $W_{BC}$ are weights. In other words, the above equation 2 refers to a difference between the color of the missing point and the surrounding color. The difference of each color is multiplied by the corresponding weight, and thus the calibrated depth value is obtained. After the above calibration is performed on each of the missing points, the triangular mesh model 430 in FIG. 4 can be established based on the point clouds. It can be understood that the triangular mesh model 430 reflects a consistent texture of object.

Figure 6:
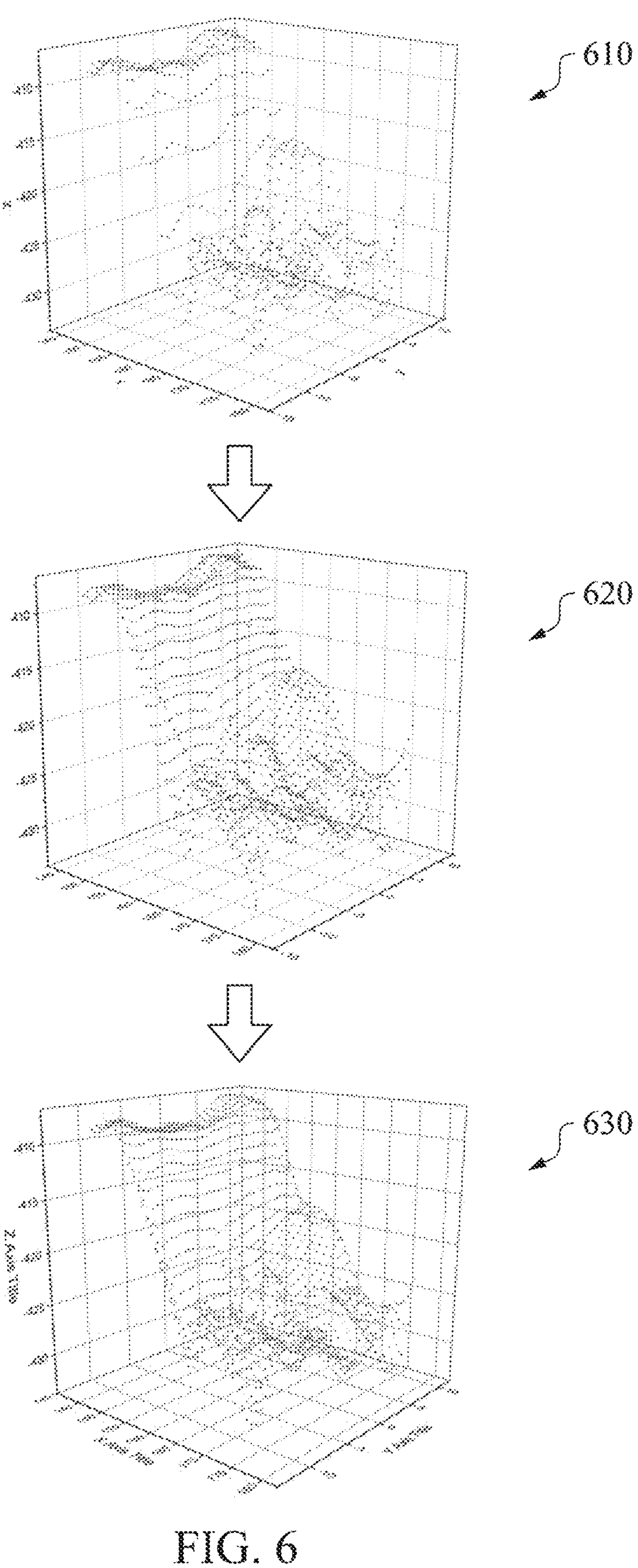
FIG. 6 is a schematic diagram showing point clouds in various optimized stages according to an embodiment of the present invention.

FIG. 6 is a schematic diagram showing the point clouds in various optimized stages according to an embodiment of the present invention. Referring to FIG. 2 and FIG. 6, after step 201, point cloud information 610 is obtained. In some experiments, it is found that an area of steep slope or a side of an object is frequently encountered during the operation of the underwater sonar, and the area of steep slope and the side of the object may result in sparse point clouds. After the processing of steps 202 and 203, the point cloud information 620 is obtained for enhancing the density of the point clouds. Then, the point cloud information 630 is obtained through the processing of step 204 to enable the point cloud information to be more consistent with the real terrain relief.

Each of the above steps in the above-mentioned FIG. 2 is implemented as plural program codes executed by a computer system, or can also be implemented as a circuit. However, the present invention is not limited thereto. In addition, other steps can also be added between the steps in FIG. 2.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A system for sensing underwater point cloud, comprising:

an underwater sonar array configured to acquire point cloud information comprising a plurality of points;

an image sensor configured to capture a digital image comprising a plurality of pixels; and a computing module communicatively connected to the underwater sonar array, wherein the computing module is configured to rearrange the points into a matrix comprising the points and a plurality of missing points;

wherein the computing module performs an interpolation calculation for each of the missing points based on depth values of neighboring points among the points to obtain a depth value of each of the missing points;

wherein each of the pixels comprises a red gray value, a green gray value and a blue gray value, and the computing module is configured to calibrate a depth value of one of the missing points based on the following equation 2:

$$P_C = P'' + [((R'' - R_{avg}) \times W_{RC}) + ((G'' - G_{avg}) \times W_{GC}) + ((B'' - B_{avg}) \times W_{BC})]$$

$$W_{RC} = \frac{R_{avg}}{\frac{1}{P''}}$$

$$W_{GC} = \frac{G_{avg}}{\frac{1}{P''}}$$

$$W_{BC} = \frac{B_{avg}}{\frac{1}{P''}}$$

wherein $P_C$ is a calibrated depth value, P" is the depth value of the one of the missing points, R" is the red gray value of the one of the missing points, G" is the green gray value of the one of the missing points, B" is the blue gray value of the one of the missing points, $R_{avg}$ is an average red gray value of a plurality of similar pixels among the pixels, $G_{avg}$ is an average green gray value of the similar pixels among the pixels, and $B_{avg}$ is an average blue gray value of the similar pixels among the pixels.

2. The system of claim 1, wherein the computing module redetermines a X-coordinate and a Y-coordinate of one of the points based on an arrangement direction of sensors of the underwater sonar array.

3. The system of claim 2, wherein the computing module performs the interpolation calculation to obtain the depth value of each of the missing points based on the following equation 1:

$$Z = \frac{\sum_{i=1}^{n} \frac{Z_i}{r_i^p}}{\sum_{i=1}^{n} \frac{1}{r_i^p}} \quad \text{[Equation 1]}$$

wherein Z is the depth value of one of the missing point, i is a positive integer, n is a number of the neighboring points, $$r_i^p$$

is a distance between one of the neighboring points and the one of the missing point, and $Z_i$ is a depth value of one of the neighboring points.

4. The system of claim 3, wherein the computing module is further configured to calculate an interpolation depth corresponding to one of the missing points based on a thin plate spline interpolation algorithm, and to calculate an average value of the interpolation depth and the depth value Z to compensate the corresponding missing point.

5. The system of claim 1, wherein the point cloud information corresponds to an area of steep slope.

6. The system of claim 1, wherein the point cloud information corresponds to a side of an object.

7. A method for sensing underwater point cloud, executed by a computer system, wherein the method for sensing underwater point cloud comprises:

acquiring point cloud information through an underwater sonar array, wherein the point cloud information comprises a plurality of points;

capturing a digital image through an image sensor, wherein the digital image comprises a plurality of pixels, each of the pixels comprises a red gray value, a green gray value and a blue gray value;

rearranging the points into a matrix comprising the points and a plurality of missing points;

performing an interpolation calculation for each of the missing points based on depth values of neighboring points among the points to obtain a depth value of each of the missing points; and calibrating a depth value of one of the missing points based on the following equation 2:

$$P_C = P'' + [((R'' - R_{avg}) \times W_{RC}) + ((G'' - G_{avg}) \times W_{GC}) + ((B'' - B_{avg}) \times W_{BC})] \quad \text{[Equation 2]}$$

$$W_{RC} = \frac{R_{avg}}{\frac{1}{P''}}$$

-continued $$W_{GC} = \frac{G_{avg}}{\frac{1}{P''}}$$

$$W_{BC} = \frac{B_{avg}}{\frac{1}{P''}}$$

wherein $P_C$ is a calibrated depth value, P" is the depth value of the one of the missing points, R' is the red gray value of the one of the missing points, G" is the green gray value of the one of the missing points, B" is the blue gray value of the one of the missing points, $R_{avg}$ is an average red gray value of a plurality of similar pixels among the pixels, $G_{avg}$ is an average green gray value of the similar pixels among the pixels, and $B_{avg}$ is an average blue gray value of the similar pixels among the pixels.

8. The method of claim 7, wherein rearranging the points into the matrix comprises:

redetermining a X-coordinate and a Y-coordinate of one of the points based on an arrangement direction of sensors of the underwater sonar array.

9. The method of claim 8, wherein performing the interpolation calculation to obtain the depth value of each of the missing points is based on the following equation 1:

$$Z = \frac{\sum_{i=1}^{n} \frac{Z_i}{r_i^p}}{\sum_{i=1}^{n} \frac{1}{r_i^p}} \quad \text{[Equation 1]}$$

wherein Z is the depth value of one of the missing point, i is a positive integer, n is a number of the neighboring points, $$r_i^p$$

is a distance between one of the neighboring points and the one of the missing point, and $Z_i$ is a depth value of one of the e neighboring points.

10. The method of claim 9, further comprising:

calculating an interpolation depth corresponding to one of the missing points based on a thin plate spline interpolation algorithm, and calculating an average value of the interpolation depth and the depth value Z to compensate the corresponding missing point.

11. The method of claim 9, further comprising:

performing a down sampling process on the digital image to allow the pixels of the digital image to be corresponded by the points of the point cloud information in a one-to-one manner.

12. The method of claim 9, wherein the point cloud information corresponds to an area of steep slope.

13. The method of claim 9, wherein the point cloud information corresponds to a side of an object.

* * * * *